United States Patent

[11] 3,566,960

[72] Inventor Robley V. Stuart
536 63rd Ave. N. E., Minneapolis, Minn. 55421

[21] Appl. No. 850,913
[22] Filed Aug. 18, 1969
[45] Patented Mar. 2, 1971

[54] COOLING APPARATUS FOR VACUUM CHAMBER
7 Claims, 1 Drawing Fig.

[52] U.S. Cl. .......... 165/107, 204/192, 204/298
[51] Int. Cl. .......... F28d 15/00
[50] Field of Search .......... 165/107; 204/192, 298, (Inquired), 118, 137

[56] References Cited

UNITED STATES PATENTS

| | | | |
|---|---|---|---|
| 3,404,084 | 10/1968 | Hamilton .......... | 204/298 |
| 3,418,229 | 12/1968 | Lakshmanan et al. .......... | 204/192 |
| 3,480,922 | 11/1969 | Flur et al. .......... | 204/298X |

*Primary Examiner*—Martin P. Schwadrum
*Assistant Examiner*—Theophil W. Streule
*Attorney*—Reif and Gregory

ABSTRACT: An apparatus for cooling a workpiece within a vacuum chamber consisting of a housing within said chamber, said workpiece overlying an opening into said housing, a cooling medium within said housing having direct contact with said workpiece, means cooling said cooling medium, and a diaphragm equalizing pressure between said vacuum chamber and the chamber within said housing.

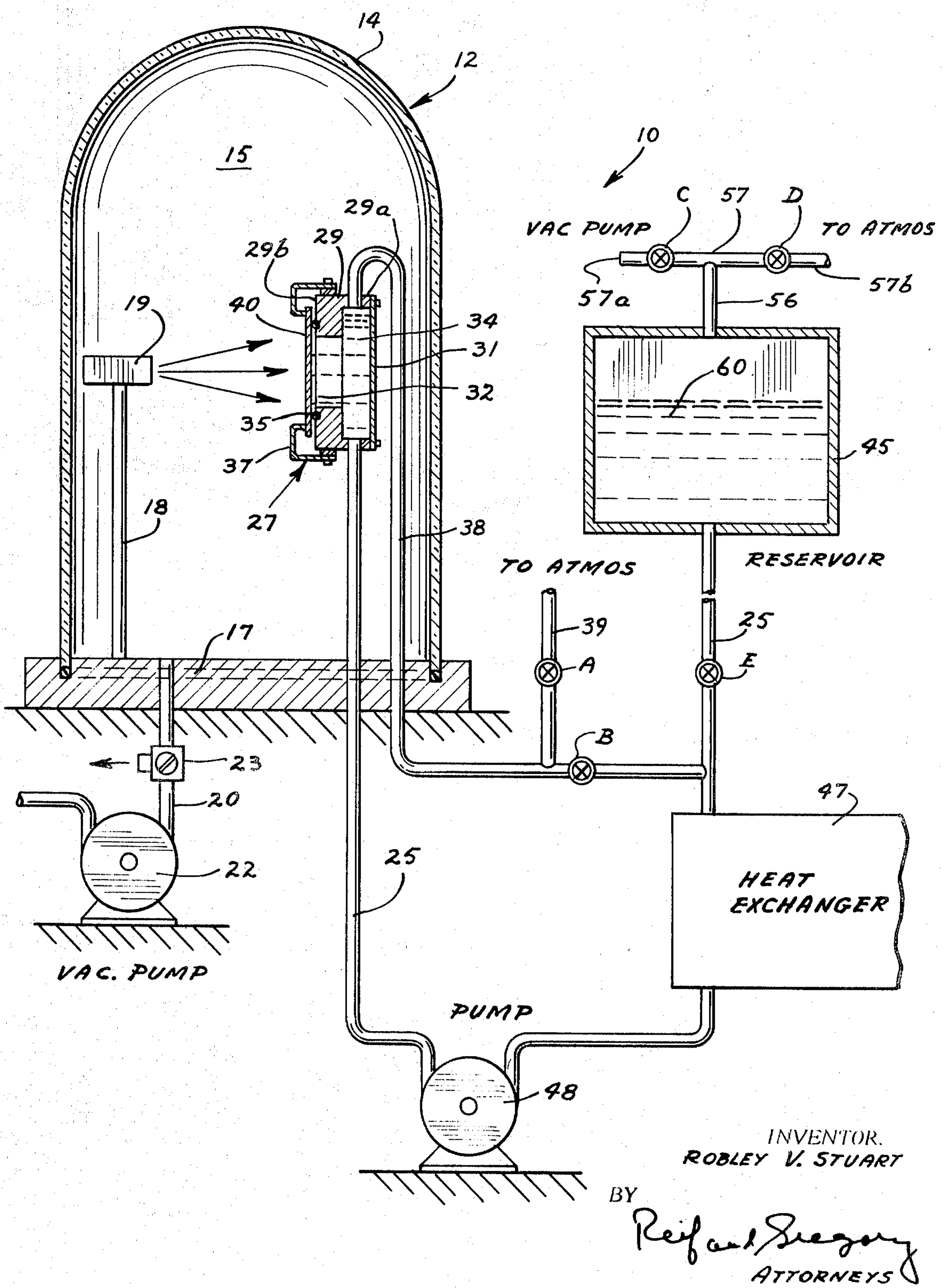
INVENTOR.
ROBLEY V. STUART
BY
Reifard Gregory
ATTORNEYS

COOLING APPARATUS FOR VACUUM CHAMBER

BACKGROUND AND SUMMARY OF THE INVENTION

This invention relates to apparatus for cooling a workpiece within a vacuum chamber. A problem in doing work within a vacuum chamber such as sputtering, involves the considerable amount of heat which is generated, and difficulty is present in either attempting to transfer or carry off heat or in contending with it. In sputtering, for example, the problem of intense heat arises from the sudden exposure of the substrate to high energy particles and the lack of means to provide a uniform controlled temperature throughout the substrate for uniform film characteristics across its surface.

Representative of related art are the U.S. Pat. Nos. 3,418,229, 3,369,991, 3,404,084, 3,250,694, 3,330,752, 3,024,965, 2,043,966 and 3,369,989. These patents involve the use of circulating cooling systems comprising coils or tubes affecting the substrate mounting or support means but do not have direct contact of the cooling medium with the substrate.

The invention herein provides for a direct and intimate contact of the workpiece or the substrate within a vacuum chamber with the cooling medium in a relatively simple and efficient operation.

Generally stated, the workpiece within a vacuum chamber is mounted to form a sidewall portion of a vessel in the circulating system being removably secured thereto. Pressure is substantially equalized between said vacuum chamber and that of the cooling system and during the course of work being done upon the workpiece, the cooling medium is maintained in a cooled condition and contacts directly a side portion of the workpiece effecting a direct transfer of heat.

There is not such a complete transfer of heat from a workpiece when the cooling medium contacts directly the mounting means or support member for the workpiece. The workpiece in resting upon another surface does not have a positive and direct contact therewith across its entire adjacent surface. A surface though apparently uniform when magnified will generally be found to have high and low areas preventing complete contact between two nonliquid surfaces. Even though such nonuniformity may be microscopic, it is sufficient to prevent a complete transfer of the heat generated across the whole of the contacted surface. The heat transfer here is substantially less efficient than that which is affected by the invention with a direct contact between the liquid cooling medium and the contacted surface of the workpiece.

It is an object of this invention therefore to provide a cooling apparatus with reference to a workpiece within a vacuum chamber wherein there is direct contact between the cooling medium and the workpiece.

It is another object of the invention herein to provide a cooling apparatus in connection with a vacuum chamber including means to mount and hold the workpiece in direct contact with a cooling medium and including means equalizing the pressure within the cooling system with that of the vacuum chamber.

More specifically it is an object of this invention to provide a cooling apparatus in connection with a vacuum chamber comprising a housing within said vacuum chamber, holding means in connection therewith to removably secure a workpiece thereto to have the same form a wall portion thereof, a cooling medium within said housing, means cooling said cooling medium, and means equalizing the pressure between said vacuum chamber and said housing.

These and other objects and advantages of the invention will be set forth in the following description made in connection with the accompanying drawings in which like reference characters refer to similar parts throughout the several views and in which:

FIG. 1 is a diagrammatic view in vertical section showing the apparatus comprising the invention herein.

DESCRIPTION OF A PREFERRED EMBODIMENT

With reference to the illustration, shown diagrammatically are the elements essential to the apparatus comprising the subject matter of the embodiment of the invention disclosed herein and said apparatus is indicated as in connection with a sputtering operation.

The apparatus generally is indicated by the reference numeral 10 and includes a vessel 12 capable of withstanding evacuation pressures, and said vessel is shown here in a conventional form of a bell jar 14 having a chamber 15 therein and having an underlying base 17.

Upstanding from said base 17 supported by a rod 18 within said chamber is a cathode 19. An outlet conduit 20 runs through said base to a vacuum pump 22. A vacuum relief valve 23 is carried by said conduit 20 to restore said chamber to atmospheric pressure.

A conduit 25 extends upwardly through said base 17 into said chamber 15 supporting a member 27, which member comprises an enclosing wall structure 29 which will be indicated here as being rectangular in cross section, with the rearward portion **29*a* thereof being of lesser thickness than its forward portion 29*b* and having a back plate 31 of sufficient flexibility to form a diaphragm, as will be described. Said wall has a front opening or port 32. Within the enclosure of said wall 29 is a chamber 34. Projecting from the front face of said wall is an annular seal 35 such as the elastomer seals commonly used in vacuum work. Carried by the forward portion of said wall is a holding means 37** which is here indicated as being formed by a pair of opposed conventional clamps.

Shown overlying said front opening 32 is a workpiece 40 which hereinafter will be referred to as a substrate. Said wall portion will function as an anode and it together with said cathode will be conventionally wired into an appropriate electrical circuit.

Said conduit 25 extends upwardly through the lower portion of said wall 29 to communicate with said chamber 34. Extending from said chamber 34 upwardly through the upper portion of said wall 29 and downwardly to extend through said base 17 and in effect serving as a continuation of said conduit 25 is a conduit 38. A takeoff conduit 39 extends from said conduit 38 forming an air passage to the atmosphere and has a control valve A therein. Said conduit 25 runs from a reservoir 45 downwardly through a conventional type of heat exchange member 47 through a liquid pump 48 and upwardly through said base 17 as first above described. Said conduit 38 extends to and communicates with said conduit 25 between said reservoir and said heat exchange member. Said conduit 25 has a valve control member E therein between said reservoir and the point of communication with it of said conduit 38. Said conduit 38 has a valve control member B therein between said takeoff conduit 39 and said conduit 25.

Said reservoir 45 is a conventional receptacle capable of withstanding evacuation of air therein above its liquid level and preferably positioned at a height substantially above that of said member 27. Said reservoir has a relatively gas free coolant or cooling medium 60 therein.

Extending from said reservoir is a conduit 56 having a tee portion 57 integral therewith having valve control members C and D respectively carried by the tee portions **57*a* and 57*b* respectively at either side of said conduit 56. Said portion 57*a* runs to a vacuum pump and said portion 57*b*** runs to the atmosphere.

It will be understood that said valves may be adapted for electrical operation as from central control means. The valves A, C and D are air control valves, and the valves B and E are liquid control valves.

It will also be understood that the scope of the invention herein embraces other means for cooling the cooling medium within the chamber 34.

OPERATION

It is known that heat exchange between objects within a vacuum is very slow as there is no medium for either conductive or convective heat transfer. When one solid object seats upon another, there is very inefficient direct conductive transfer of heat between the objects. The superposed surfaces of the objects will be sufficiently lacking in absolute uniformity for complete surface to surface contact, so that there is very little direct conductive transfer of heat. The attempt to apply a gaseous or liquid conductive medium between the two objects to improve the heat transfer is an extremely difficult one.

The invention herein provides for the object to be cooled to overlie a port of a chamber through which port the object will have direct contact with a cooling medium maintained at a pressure substantially that of the pressure in the vacuum chamber. The differential of pressure across the object to be cooled is of such a small magnitude that it may be disregarded. The force required to maintain the object in a sealed condition is minimal because of the very limited pressure differential across the object. The cooling medium being in direct contact with said object provides a very effective and efficient heat transfer for cooling the object.

For example, with respect to an object held and a diaphragm each having a height of 3 inches and the liquid coolant being in a column and a maximum height of 3 inches with respect to the bottom points to the object and diaphragm, the pressure differential would be 0.1 p.s.i. The pressure differential at the uppermost point of the object and the diaphragm would be zero. This example presupposes that the top of the column of coolant would be at the same level as the top of the workpiece and of the diaphragm. This would represent a preferred arrangement.

In putting the apparatus herein to use, the bell jar will be lifted from the base and the substrate will be placed in position overlying the port 32 against the seal 35 and will be secured by the clamps 37. The bell jar is replaced onto the base 17 and the chamber 15 therein is thus sealed.

Valve A is opened. Valves B, C and E are closed. The valve D is opened and the liquid in the reservoir 45 is under atmospheric pressure. Valve E is opened to permit the liquid in the reservoir to fill the conduit 25 up to the valve B and including the chamber 34. Valves A, E and D are then closed. Valve C is opened for evacuation of the air above the liquid level in the reservoir 45 and then valve C is closed. Valve B is then opened. At this point the conduits 25 and 38 including the chamber 34, the heat exchange member 47 and the pump 48 provide a closed circulating system for the cooling medium. Said coolant medium preferably is a relatively gas free liquid such as water having a substantially reduced gas content. Liquids, being relatively incompressible, have a low coefficient of expansion in the presence of pressure variations.

The vacuum chamber 15 is then evacuated. The back plate 31 of the chamber 34 flexes sufficiently as a diaphragm to substantially equalize the pressure within the chamber 34 with that within the chamber 15. The gas present in the cooling medium is not of such significant magnitude as to cause a pressure differential problem. The diaphragm will flex very little.

Valve E is now opened to provide a head of liquid for the closed cooling system. The pump 48 is actuated to circulate the coolant medium.

During the time that work is being done within the vacuum chamber, such as sputtering, the cooling medium is circulated through the chamber 34 and it has direct contact with the adjacent side of the workpiece or substrate to effect a direct and efficient transfer of heat therefrom.

After the work is completed, the pump 48 is stopped, valve E is closed and the chamber 15 is let up to the atmospheric pressure through the valve 23. The valve B is closed. The valves A and E are opened allowing atmospheric pressure to force the cooling medium from the cooling chamber 34 back into the reservoir 45, the area above the liquid level in the reservoir having been previously evacuated to have a lower than atmospheric pressure. When the chamber 34 is emptied, the valve E will be closed and coolant is allowed to remain in the lower portion of conduit 25. The bell jar is removed and the clamps are loosened for removal of the substrate.

The next workpiece is then placed in position and the above described operation is repeated.

Thus it is seen that there has been provided a simple and efficient apparatus for cooling a work piece within a vacuum chamber.

I claim:

1. A cooling apparatus for a workpiece within a vacuum chamber, having in combination:
- a housing within said vacuum chamber having a chamber therein, and said housing having an opening therein into said vacuum chamber;
- holding means in connection with said opening securing said workpiece thereover;
- means substantially equalizing pressure between said vacuum chamber and said housing chamber;
- a cooling medium within said chamber of said housing; and
- means in connection with said housing cooling said cooling medium.

2. The structure set forth in claim 1, wherein said last mentioned means comprises a heat exchange member.

3. The structure set forth in claim 1, wherein said last mentioned means comprises:
- a reservoir for said cooling medium;
- a heat exchange member in connection with said cooling medium; and
- means for passage of said cooling medium between said reservoir and said housing.

4. The structure set forth in claim 1, wherein said last mentioned means comprises:
- a reservoir for said cooling medium;
- means placing said cooling medium within said reservoir under controlled pressure;
- means for passage of said cooling medium between said reservoir and said chamber within said housing; and
- a heat exchange member in connection with said cooling medium.

5. The structure set forth in claim 1, wherein said second mentioned means comprises a diaphragm in connection with said housing.

6. The structure set forth in claim 1, wherein said second mentioned means comprises a diaphragm forming a portion of said housing.

7. The structure set forth in claim 1, wherein said last mentioned means comprises:
- a reservoir for said cooling medium;
- means in connection with said reservoir controlling the pressure upon said cooling medium;
- a heat exchange member;
- a pump; and
- means for passage of said cooling medium between said reservoir, said heat exchange member, said pump and said housing.